-continued

| THE FOLLOWING IS A GENERAL FORMULA FOR THE MASTIC | WEIGHT PERCENT PREFERRED | TOTAL RANGE |
|---|---|---|
| Antimony Oxide | 4–10 | 2–15 |
| FRIT | | |
| Ceramic Glazing Solids (typically low-fusing borosilicate glasses generally calcium, magnesium, zirconium, borosilicates (generally lead-free) | 10–25 | 5–40 |

In forming the composition, the dry components are mixed and evenly blended with the plastic to form a heavy mastic, adding a small quantity of water in the range stated, sufficient to bring the mastic up to viscosity suitable for application upon the cables assembled and panels as show, filling all of the openings, cracks and crevices. The mastic formed as described may be extruded or pressed into sheets of desired thickness, such as ¼–1½ inches thick. In order to improve both the dry and wet structural properties of the panel pressed or extruded from the mastic mass, an addition of a heat polymerizable acrylic resin, such as Rohm and Haas X-980 is added. The wet panel may be set by drying and removing the moisture at ambient temperatures. When the acrylic additive in the range of 2–10%, preferably in the range of 4–6%, it is necessary to raise the panel temperature to 300°–350° F. in order to complete the polymerization. Without such acrylic additive, the tape or other mastic product is less sensitive to moisture.

The cables themselves are encased in coating, which may be thin and flexible or may be applied as a filler mastic between a group of cables as shown in FIG. 1 and which may pass through the paneling, cut with holes to allow cables or trays having a number of separately spaced cables to pass through from side to side of the fire stop wall, and the cracks and crevices about each cable are then filled with the mastic as shown in FIGS. 1 and 6. Thus the mastic is applied by spraying, troweling or brushing upon the cables, between the cables, upon the fire stop wall as a coating and as the paneling substance from which the wall per se is formed.

As shown in FIG. 7 an electrical arc and fire protective tape is provided having cellulose sheeting or nonwoven polyester film or fabric base 102 or preferably cellulose fibers such as cotton or rayon which have been previously treated with fire retardant salts and, on this substrate a coating 104 of the mastic described above is applied preferably within the thickness limits stated. The mastic can also have small fibers 106 as listed above embedded within the mastic. In forming the tape, the fabric 102 becomes a conveyor and the wet mastic is applied in the thickness within the range stated by a knife and doctor blade as in conventional coating, the wet coated sheet is passed through a warmed oven or drying chamber through which a stream of warm air is circulated to provide a drying temperature lower than about the boiling point of water, whereby the water will evaporate to leave the dried mastic coating upon the fabric. It is desirable to dry the coated sheet or fabric in the warm air stream while moving at low speeds of below 10 feet per minute, a rate slow enough within the drying chamber to allow removal of the moisture from the tape at a slow enough rate to avoid any significant formation of vapor bubbles in the wet mastic while drying. That drying rate can be accelerated somewhat by inclusion of a small quantity of mineral spirits such as petroleum about 1 to 2% added to the mastic mixture, to supply an azeotropic vaporization of the water and petroleum ether at a somewhat lower temperature and thereby promote a faster drying rate. The azeotropic component can be omitted and the drying can be effected at a slower rate. The tape having dry mastic thereon bears the benefits of the superior fire and arcing prevention character of the mastic.

As shown in FIG. 8 the tape 100 may be wound about a cable sheath 108 in the manner typical for the insulation of a cable by a tape. As shown in FIG. 9 the tape 100, which in this case is a thin laminate of mylar (0.001") 103 and mastic (0.010") 100 wrapped around the insulated multiple conductors and the mastic/mylar laminate wrap covered with an extruded water resistant jacket 108 of polyethylene, polypropylene, ethylene propylene rubber or equivalent of some 30 mils thickness.

As noted the tape support or substrate 102 may be of various types of woven or matted fiber, of which Reemay, a polyester spun-woven fabric is often preferred because of its substantial strength. It bears the disadvantage, however, that it evolves smoke with heat decomposition and from that aspect ordinary very light rayon or cotton fabric, such as gauze or even cheesecloth made fire retardant by pretreatments can be used because these evolve little smoke and will serve to adequately support the mastic layer while it is being applied as a knife coated surface layer. As a tape cotton fabric is physically of weaker construction but has the stated advantage of giving off little smoke upon heat decomposition. Polyester film such as Mylar as thin as stated can be used as a substrate in tapes for cable manufacturing. Also, ceramic fiber fabric or sheet can be used advantageously in that they give off no smoke and are more heat resistant, but from the aspect of economy are more expensive.

The following examples illustrate the practice of this invention:

EXAMPLE 1

Four hundred and sixty-two pounds of vinyl acrylic polymer dispersed in water in quantity of about 277 lbs of polymer, the remainder of said emulsion being water and additives. The additives consist of 13 lbs of propylene glycol, 6 lbs of Colloid 677, oil based liquid polysiloxane, 1.5 lbs. of hydroxy methyl cellulose, 6.5 lbs of rayon fiber, 1.5 lbs of Strodex PK 90, potassium polyphosphoric acid ethyl ester and 0.5 lbs of a mercurial complex preservative. The entire mixture being a viscous dispersion in water. Separately, a dispersion of 1.0 lbs of Triton X 100, which is octyl phenyl polyethyleneoxyethanol, 5.7 lbs of Tamol, sodium salt of polycarboxylic acid, are dispersed in 50 lbs of water. The aqueous solution of dispersing agents and additives is used to dilute the first resinous emulsion. Thereafter dry powders consisting of 190 lbs of hydrous aluminum oxide, 90 lbs of cenospheres, 80 lbs of zinc tetraborate,